United States Patent

[11] 3,628,600

[72] Inventor Alden I. McFarlan
 691 Dorian Road, Westfield, N.J. 07090
[21] Appl. No. 14,738
[22] Filed Feb. 24, 1970
[45] Patented Dec. 21, 1971

[54] AIR-CONDITIONING SYSTEM AND CONTROL INCLUDING CONTROL METHOD AND MEANS
16 Claims, 1 Drawing Fig.

[52] U.S. Cl. ..................................................... 165/22
[51] Int. Cl. ..................................................... F24f 3/00
[50] Field of Search .......................................... 165/50, 22, 26, 27, 58

[56] References Cited
UNITED STATES PATENTS
3,024,008  3/1922  Blum .............................. 165/22

3,354,943  11/1967  McFarlan ..................... 165/2

*Primary Examiner*—Charles Sukalo
*Attorney*—Curtis, Morris & Safford

ABSTRACT: An air-conditioning system is disclosed for a building or buildings with a plurality of conditioned spaces or zones wherein there is a special control system which insures the proper heating and cooling of each of the conditioned spaces or zones with minimum equipment and energy consumption. Refrigeration units provide a constant supply of chilled water and a constant supply of hot water. Separate streams of the chilled and hot water are delivered to air coils through which air is supplied to the various conditioned spaces. The temperature of the water in the hot water line is used to determine whether there is an excess or deficiency of heat in the system, or if an exact balance has been achieved. The controls change the operation to achieve a proper heat balance.

PATENTED DEC 21 1971
3,628,600
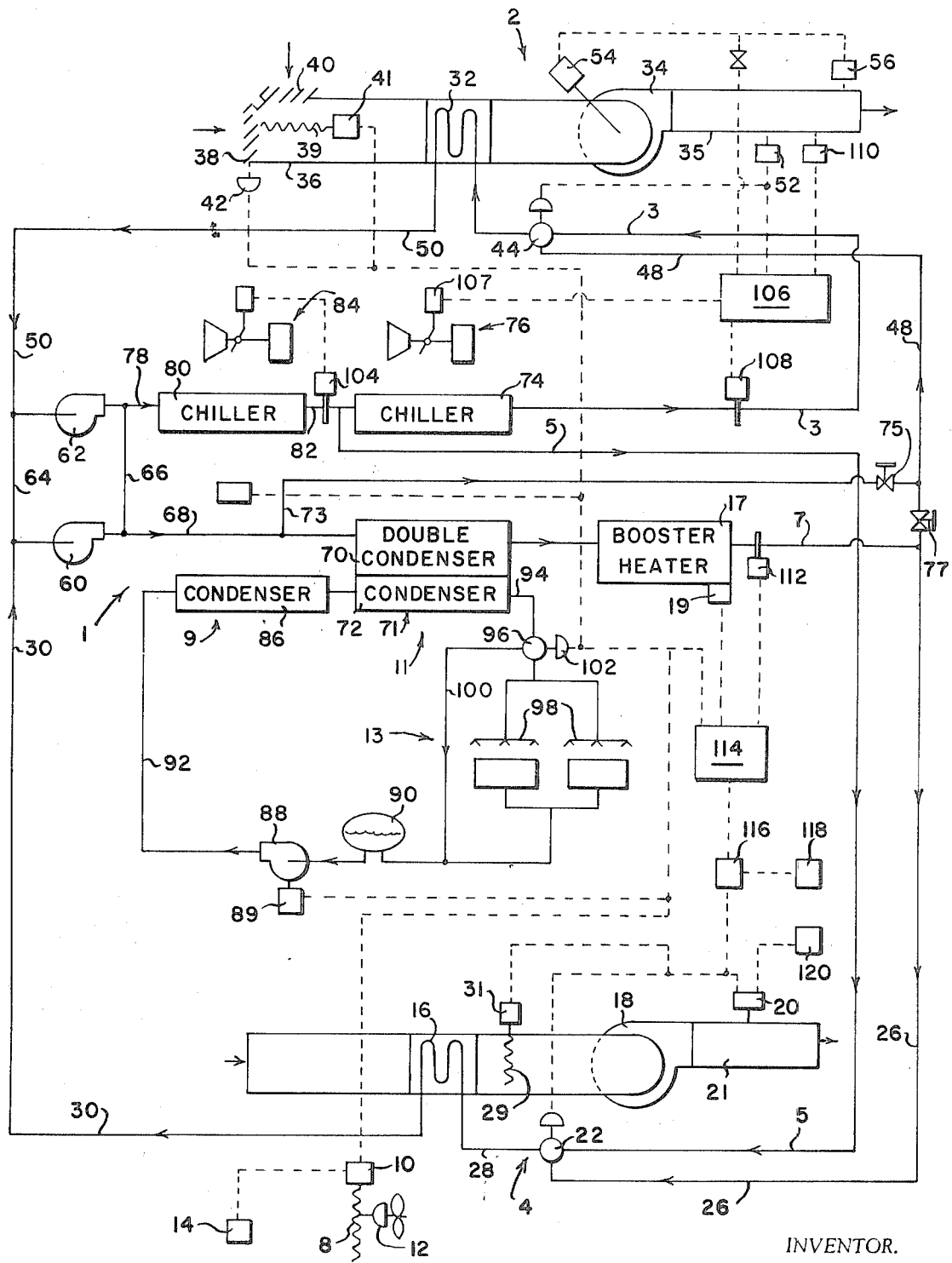
INVENTOR.
Alden I. McFarlan
BY
Curtis, Morris & Safford
ATTORNEYS

AIR-CONDITIONING SYSTEM AND CONTROL INCLUDING CONTROL METHOD AND MEANS

This invention relates to air conditioning, and to the control of air condition systems in buildings where there are operating conditions during which there is an excess of heat in some zones or spaces and a need for heating elsewhere, and wherein the system is operable to utilize the excess heat in one zone to provide the heating where it is needed and to discharge unneeded overall excess heat from the system.

In my prior patent, U.S. Pat. No. 3,354,943, dated Nov. 28, 1967, there are disclosed air-conditioning systems of the above type. It is an object of the present invention to provide for the control of systems of the type disclosed in that patent. It is a further object to provide improved modes of operation for air-conditioning systems of the above character. It is a further object to provide simple and accurate control of the conditioned air in various spaces or zones in buildings, where under some conditions of operation there is excess heat in one area or zone and there is a deficiency of heat in another area or zone, and where there may be an overall excess or an overall deficiency of heat in the system. It is a further object to provide improved apparatus and methods for maintaining desirable conditions in air-conditioned buildings and the like. These and other objects will be in part obvious and in part pointed out below.

In the drawing, the single FIGURE is a schematic representation of one embodiment of the invention.

Referring to the drawing, an air-conditioning system of the illustrative embodiments in the above-identified patent is shown, and reference may be had to that patent for a fuller explanation of any details of construction and operation of the system. By reference, the above-identified patent is incorporated herein as part of the present disclosure, and the system of the present disclosure is as disclosed in the above-identified patent except for the differences specifically described.

In the illustrative embodiment, the system includes: a central water cooling and heating system 1, an air treating unit 2, shown at the top of the FIGURE, for supplying a variable-volume stream of conditioned air at a fixed temperature; an air treating unit 4, shown near the bottom of the FIGURE, for supplying a stream of conditioned air of fixed volume but variable temperature; and an air heating unit in a ceiling plenum chamber which has strip electric heaters 8, a control unit 10, a fan 12 which circulates the air, and a low-limit switch 14 which overrides the control signal to control unit 10 whenever the air temperature falls below a predetermined value. System 1 provides streams of chilled water through lines 3 and 5, and a stream of hot water through a line 7 to branch lines 26 and 48. Water flows to line 7 through a booster heater 17 which heats the water under the control of a controller 19, either by electric resistance heaters or by steam. System 1 has two refrigeration stages, comprising first and second stage refrigeration system units 9 and 11, and there is a cooling tower 13.

Air treating unit 4 has a water coil 16 through which air is drawn by a fan 18 so as to heat or cool a stream of return air under the control of a control unit 20 and the conditioned air is delivered from fan 18 through a duct 21. Control unit 20 controls a water valve 22 which is connected to chilled water line 5 and hot water line 26, and which supplies a fixed stream of water from those lines through a line 28 to coil 16. Valve 22 supplies to the coil a stream of either hot water or chilled water, or a mixture of the two, and the water, is discharged from the coil through a common return line 30. An electric strip heater 29 with a control switch 31 provides auxiliary heat to the air stream.

Air treating unit 2 has an air treating coil 32 through which air is drawn by a fan 34 from an air mixing chamber 36 to which return air is supplied through control louvers 38, and outside or fresh air is supplied through a set of control louvers 40. The positions of louvers 38 and 40 are determined by a controller 42 which regulates the relative proportions of return air and outside air, as will be explained below. A controller 54 adjusts fan 34 under the control of a pressure-responsive controller 56 so as to maintain a predetermined air pressure in the stream of air flowing from the fan. Hence, the stream of air is at the fixed temperature to which thermostat 52 is adjusted, and the volume of air is varied so as to maintain the desired air pressure in the air supply duct.

Chilled and hot water are supplied to coil 32 through a valve 44 from chilled water line 3 and a hot water line 48, and the water is discharged from coil 32 through a common return line 50. Valve 44 supplies either hot or chilled water, or a mixture of the two, to coil 32 under the control of a thermostat 52 which is responsive to the temperature of a stream of air discharged from fan 34 through a distribution duct 35. Thermostat 52 is adjustable but, as indicated above, it maintains the temperature of the stream of air at the set temperature. Hence, a drop in the air temperature below the set value, or a reduction in the air flow, causes valve 44 to supply a greater portion of hot water to coil 32 up to an end position where the coil receives no chilled water from line 3. Conversely, a rise in the air temperature above the set value, or an increase in the air flow, causes valve 44 to supply a greater portion of chilled water to coil 32 up to an end position where no hot water is supplied to the coil.

The common return water lines 30 and 50 extend to a pair of pumps 60 and 62 which are in parallel and which have their inlet sides interconnected by a line 64 and their outlets interconnected by a line 66. Extending from line 66 there is a line 68 which extends through the water-heating condenser section 70 of a double condenser 71, there being another condenser section 72 in parallel therewith. Condenser sections 70 and 72 constitute the condenser for the refrigeration unit 11 which also includes an evaporator chiller 74 and a centrifugal compressor 76. The stream of heated water flows from condenser section 70 through line 7 which is the common hot water supply line for the entire air-conditioning system. However, as will be explained more fully below, for some conditions of operation it is desirable to supply water to pump 60 directly to line 48 without passing through the double-condenser section 70. Accordingly, a line 73 extends from line 68 through a manual valve 75 to line 48 and there is a manual cutoff valve 77 at the juncture of lines 7 and 48. Hence, valves 75 and 77 function as a three-way valve with valve 77 being closed when valve 75 is open, and with valve 75 being closed when valve 77 is open.

A line 78 also extends from line 66 through the evaporator-chiller 80 of refrigeration unit 9 and then through a line 82, which is connected to the chilled water line 5 and also through chiller 74 to the chilled water line 3. Refrigeration unit 9 also includes a centrifugal compressor 84 and condenser 86. As will be explained more fully below, chiller 80 is provided with means to recirculate the liquid refrigerant in a manner to provide for some cooling of the water flowing through it when the refrigeration unit is not operating.

A cooling tower water pump 88 circulates water from the sump tank 90 of the cooling tower through a line 92 and then through condenser 86 and condenser section 72 to a line 94. Line 94 extends to a valve 96 which directs part or all of the water to the spray heads 98 of the cooling tower, and which directs the remainder or all of the water through a bypass line 100 back to the sump tank 90. Hence, when pump 88 is operating the water may circulate through the condensing circuit with all or part passing through the cooling towers, so that the entire stream is cooled, or all or part of the water may be diverted through the bypass line 100 without being cooled. The position of valve 96 is determined by a controller 102 so as to provide the desired cooling of the stream of water.

Controller 84 is controlled by thermostat controller 104 which maintains a predetermined water temperature in line 82, and water at that temperature is delivered through line 5 and valve 22 to coil 16. The operating of the second stage compressor 76 is controller unit 107 from a controller 106 which has thermostat controller 108 which is responsive to the temperature of the chilled water in line 3. The temperature of the chilled water in line 3 is lower than that in line 5, and is supplied through valve 44 to coil 32. In order to maintain the desired dewpoint of the air in duct 35, a humidistat controller 110 is positioned in the duct. Controller 110 modulates the control by controller 106 to reduce the chilled water temperature to correct a rise in humidity. The control by controller 106 is also modulated by the pressure-responsive controller 56 so as to insure a sufficiently low temperature in the chilled water to maintain the desired air temperature and pressure. The control by controller 106 may also be modulated by thermostat 52 to permit a rise in the temperature of the chilled water in line 3 at light cooling loads on coil 32, but controller 110 would be able to override any such action by thermostat 52.

It has been indicated above that the present invention is particularly concerned with the control of the system during periods when heating is required in any space or zone to which conditioned air is supplied. If the heat requirements for the zones requiring heating are greater than the heat which is being added elsewhere in the system, there is an overall deficiency of heat in the system and the temperature of the water in hot water line 7 will tend to drop. Conversely, when the heat requirements of the zones requiring heating are less than the heat which is being added elsewhere in the system, there is an overall excess of heat in the system and the temperature of the water in hot water line 7 will tend to rise. A continued unbalance in the form of an overall deficiency of the heat required, or an overall excess of heat, cannot be tolerated and is avoided by the present invention. An overall heat balance for the system exists when the total overall heat requirements of the zones being heated equal the overall excess of heat which is being added elsewhere in the system. When that overall heat balance is achieved, the control system of the present invention detects that the temperature of the water in line 7 is within an acceptable range. That range may be determined for the particular system and its operation conditions. Hence, in accordance with the present invention, that single temperature is used to provide the basic control for the operation of the entire system.

The control system includes a thermostat controller 112 which senses the temperature in the hot water line 7 and which exerts the overall, or basic control through a controller 114. There is a control selector unit 116 which may be set manually to operate the system for "summer" control or for either of two "heat balance" controls. For purposes of the present discussion we are concerned only with the "heat balance" controls. However, when unit 116 is set for "summer" control the arrangement is such that controller 114 does not operate heat-producing components in the system, and the system is operated in the manner of the systems described in the above-identified patent. When unit 116 is set for one "heat balance" control, controller 114 is modulated to take into account the outside temperature sensed by a thermostat controller 118. For example, assuming that controller 114 is adjusted to exert control in accordance with a predetermined "set temperature" of the water in line 7, thermostat controller 118 may exert control through unit 116 to modulate the action of controller 114. That is, controller 114 then operates as a submaster thermostat controller, with controller 118 acting as the master thermostat controller. Such controls are well known in the art in both electrical and air pressure control systems, and reference may be had to current literature for specific details of such control units and systems. With such systems, the effect of the master controller is to cause the submaster controller to perform its control functions as if it had been reset to a higher or lower "set temperature." For example, assume that controller 118 senses a drop in the outside temperature which indicates that there must be an increase in the temperature of the water in the hot water line 7 in order to maintain the proper amount of heating in the building. The immediate action of controller 118 in response to that sensing is to modulate the action of controller 114 so that the system is controlled to maintain the temperature in hot water line 7 above the original "set temperature."

For the other "heat balance" control, unit 116 is set to permit thermostat controller 20 to modulate the action of controller 114. As indicated above, controller 20 is responsive to the temperature of the air in duct 21 and it exerts control on valve 22 so as to regulate the temperature of the water in coil 16, and it also acts through controller 31 to control the electric heater 29. However, controller 20 has a master thermostatic controller 120, which senses the outside air temperature and modulates the action of controller 20 in a master-submaster relationship. Hence, master controller 120 bears the same relationship to submaster controller 20 as that discussed above between master controller 118 and submaster controller 114. However, when unit 116 is positioned to connect controller 20 to controller 114, controller 118 is rendered ineffective and controller 20 then acts as the master controller with respect to controller 114. With that mode of operation, controller 120 modulates controller 20 and controller 20 in turn modulates controller 114.

When unit 116 is set for controller 114 to exert the master control for the system in accordance with the temperature of the hot water in line 7 as sensed by thermostat 112, there is a "set" control temperature on controller 114 with respect to which the control functions are carried on. In the drawing the broken lines represent lines of control. Controller 114 controls the operation of the cooling tower pump 88 through controller 89, valve 96 through controller 102, and the supplying of steam to converter 17 through control valve 19. It also acts through controller 42 to control the dampers or control louvers 38 and 40 so as to regulate the relative amounts of return air and outside air which flow through coil 32 to duct 35.

Normally when controller 114 is calling for heat, the control louvers are set for minimum outside air; i.e. that which is required for ventilation. However, when the outside air temperature is below a predetermined temperature and thermostat controller 112 senses a temperature which causes controller 114 to require an increase in the rejection or discharge of heat from the system, controller 114 moves the control louvers 40 toward the fully open position to increase the amount of outside air which flows to coil 32, and there is a corresponding closing movement of control louvers 38 to decrease the amount of return air flowing to the coil. Therefore, the temperature of air flowing to the coil is reduced with the result that thermostat controller 52 senses a need for an increased amount of hot water to the coil and a corresponding decrease in chilled water. Hence, coil 32 acts as a heat disposal unit in the sense that excess heat is delivered through it to heat the added amount of cold outside air. That is, when considering the operation when the minimum amount of outside air is being delivered to the system through control louvers 40, the air stream must be heated to a certain minimum amount in order to provide air at the desired temperature in duct 35. When the additional quantity of fresh or outside air is added, coil 32 must deliver heat in addition to that minimum amount, and that additional heat represents heat which controller 114 has determined represents overall excess heat in the system. Considering the specific function of controller 114, thermostat controller 112 senses a rise in the water temperature in line 7 and controller 114 responds by supplying a higher percentage of outside air to the stream flowing through coil 32. That causes thermostat controller 52 to adjust valve 44 so that a greater quantity of water flows from line 48 and a lesser quantity flows from the chilled water line 3. If valve 77 is open and valve 75 is closed so that hot water is supplied to line 48 from line 7, the increase in the flow of water from line 48 will cause an increase in the rate of flow through the double-condenser section 70 and a reduced load on the water cooler so that there is a reduction in the temperature of the water in line 7. Such a reduction causes the hot water temperature to move back toward the set temperature which is achieved when there is an acceptable overall heat balance in the system.

It has been pointed out above that the bypass line 73 extends from line 68 through valve 75 to line 48, so that when valve 75 is open and valve 77 is closed, water flows directly from pump 60 through lines 68, 73 and 48 to valve 44. With the water circuit arrangement shown, pump 60 tends to pump the water which has circulated through the coil 16 and line 30, whereas pump 62 tends to pump the water which has circulated through coil 32 and line 50. The interconnecting lines 64 and 66 provide for cross flow and they maintain the desired equal pressure conditions at the inlet and outlet sides of the pumps, but there is still the tendency referred to above for "stratification" of the flow from line 30 through pump 60 and from line 50 through line 62. Hence, with valve 75 open and valve 77 closed, assume that the water returning through line 30 is at a temperature above that of the water returning through line 50, the warmer water from line 30 will be delivered through lines 68, 73 and 48 to valve 44. Valve 44 will deliver the required mixture of water from lines 48 and 3 to maintain the desired air temperature at thermostat controller 52. The percentage of the water from line 48 will be greater when the temperature of that water is relatively low. Hence, the amount of water delivered from line 48 through valve 44 is greater if it is the relatively cooler water from pump 60 and line 73 rather than the hot water from line 7.

The fact that controller 114 has sensed an excessive amount of heat in the system indicates that heat is being added to the system more rapidly than it is being discharged from the system. With that condition of operation, a lesser amount of chilled water is taken from line 3 through valve 44 and that reduces the overall requirement for chilled water and the overall requirement for refrigeration. Hence, the bypassing of water through line 73 causes a decrease in the refrigeration load, and that decrease in the refrigeration load causes an immediate decrease in the amount of heat being added to the system; that decrease including the reduction in the power requirements for the system. Therefore, the increase in the amount of fresh air which is provided by opening dampers 40 has an additional immediate effect of reducing the amount of heat which is being added to the system.

The increase in the quantity of outside air which is added to the system by opening control louvers 40, causes a corresponding increase in the air pressure within the conditioned spaces or zones, and an increase in the air leakage from the system. That is, with normal operation there is a slight increase in the air pressure, and there is a normal air leakage from the space corresponding to the stream of air added to the system by the introduction of outside air. The increase in the stream of outside air which is introduced through control louvers 40 causes a corresponding increase in the air pressure and in the loss through leakage, and the leakage may occur at one or more zones or throughout the conditioned spaces or zones. It is an important aspect of the present invention to utilize that variation in air leakage as a control feature: namely, to increase the air leakage so as to utilize that air leakage as a heat discharge medium.

There is a very substantial improvement in the operation of the system resulting from the fact that coil 32 constitutes a supply of low-temperature water when an increased amount of low-temperature outside air is heated by the coil. Hence, the low-temperature water returns through line 50, passes through pump 62 and, because of the pumping arrangement, a substantial portion of the water which flows into chilled water line 5 is the chilled water which has returned through line 50. Therefore, the low-temperature water from line 50 is available for cooling air in various air treating units (not shown). Also, that low-temperature water from line 50 flows through chiller 74 and, because of its reduced temperature, there is a very substantial reduction in the refrigeration load. It has been noted above that under the operating conditions which have been described there is a reduced amount of chilled water required from line 3 and that feature, combined with the precooling of the water returning from line 50, constitutes a very substantial reduction in the overall refrigeration load. Simultaneously, the reduced refrigeration load is also reflected in a corresponding reduction in the heat given off by the double-condenser section 70 to the water flowing to line 7.

In summation, there is a general flow of low-temperature water from coil 32 through line 50, and a general flow of water at the higher temperature from coil 16 through line 30. The water from line 50 is utilized to cool air in the system by other heat-treating units, and a reduced amount flows through chiller 74. The higher temperature water from line 30 is supplied without a substantial change of temperature to coil 32, and an increased amount passes through the coil so as to reduce the requirement for chilled water from line 3.

In the illustrative embodiment two air-treating units 2 and 4 are shown, the first of which treats a mixture of outside air and return air and the second of which treats return air. It is understood that a system of this type may include many air-treating units. Hence, in considering the advantages of the invention it will be understood that the hot water line 7 and the chilled water lines 3 and 5 extend to other air-treating units.

The mode of operation just described is also very advantageous for some conditions of operation when the outside air temperature is above the air temperature in duct 35. When the outside air requires less overall cooling than the return air to satisfy the temperature and humidity conditions of the air in duct 35, a reduction in the amount of return air and an increase in the amount of outside air will reduce the rate of heat load on coil 32. In general, for most air-conditioning systems of the type shown in the drawing, the break-even point in this regard is when the wet bulb temperatures of the outside air and return air are equal. Hence, for the overall control, the relative amount of outside air may be increased for the purpose of overcoming an excess heat condition whenever the wet bulb temperature of the outside air is below the wet bulb temperature of the return air. That produces an effective heat-discharge function with the corresponding attendant advantageous results discussed above. Coil 32 will require less chilled water from line 3 and more water from line 48 and the temperature of the return water in line 50 will be reduced. Hence, there will be a net overall reduction in the refrigeration requirements. There will also be an increase in the rate of heat loss through air leakage, as discussed above.

It should be noted that the system switches over automatically to adjust the control louvers to supplying minimum outside air whenever the outside air temperature and humidity rise to a point where the outside air produces a greater load on coil 32 than does the corresponding amount of return air. It is thus seen that the feature of increasing the amount of outside air is advantageous over a very wide range of operation, but that the excess outside air is supplied only when it is advantageous to do so. Also, very precise control is provided for the system without the creation of conditions which tend to cause "hunting" and with intricate and complicated control functions which oppose one another.

In the illustrative embodiment of the present invention booster heater 17 in line 7 may be an electric water heater in which the water is heated by resistance heaters having the controller 19. Controlled 19 acts in response to the temperature of the water flowing from the double-condenser into line 7. Hence, when that temperature is below a predetermined value, control 19 provides auxiliary heat, but such auxiliary heat is provided only when required. The heating of the water flowing through line 7 by heater 17 does not interfere with the basic control of the system as discussed.

When there is a rise in the temperature of the hot water in line 7 through the control range, controller 114 carries on a sequence of control steps. Each of the steps involves the performance of one or more control functions. Assume that the system has been operating with heat being added to make up for heat losses, and there is then a rise in the temperature. Control 19 first operates to shut off the booster heater 17. Upon a very small additional temperature rise, the other auxiliary heating units are turned off; first control 41 is operated to turn off strip heaters 39 which preheat the outside air, and then the electric heater 8 in the plenum chamber are turned off. Upon a further temperature rise, the control louvers are adjusted to provide the gradual increase in the supply of outside air. The next steps are to start the cooling tower pump 88, and then to turn valve 96 to pass part and then all of the water to the cooling tower.

The system also has a "thermocycle" unit (not shown) connected with the chiller 80. That unit is turned on as the next step, just prior to starting the compressor 84 of the refrigeration unit 9. The "thermocycle" system has a refrigerant pump which draws liquid refrigerant at the bottom of the evaporator chiller 8 and sprays it into the top of the evaporator thus to promote evaporation of liquid. THere is also a heat exchanger through which water from the cooling tower is circulated in heat exchange relationship with refrigerant gas which is permitted to pass from the top of the evaporator. That cooling of the refrigerant gas causes it to condense, and the liquid refrigerant returns to the refrigerant pump by which it is sprayed into the evaporator. Hence, the refrigerant performs the cooling function without the necessity for operating the refrigeration unit. A further rise in the temperature of the hot water in line 7 causes controller 114 to start the compressor of the refrigeration unit 9.

The above sequence of steps is carried on with a very narrow rise in the temperature of the water in line 7; for example, a range of the order of 2 to 3 degrees. The above steps are carried on in the reverse order upon a gradual drop in the hot water temperature through substantially that same range. When carrying on the sequence upon either a rise or a fall in the hot water temperature, a stable condition is reached whenever a true heat balance condition has been attained. It should be noted that a rise in the hot water temperature takes place only when an additional amount of excess heat has been added to the system. Conversely, there is a drop in the hot water temperature only when there has been a decrease in the overall heat in the system. Hence, when controller 114 has performed a step which produces a corrective control function and the temperature has been stabilized by those control functions, the hot water temperature will remain constant as long as the heat balance condition exists.

In this embodiment and in most commercial installations, the overall control temperature is the temperature of the water or glycol solution, or other conditioning medium leaving the double condenser, and downstream from the booster heater when one is used. With some systems having reciprocating compressors, that temperature is a function of the temperature and pressure of the gas refrigerant in the condenser, i.e., the "heat pressure" at the compressor. Hence, for some systems control of the system may be in accordance with the condenser refrigerant temperature or the head pressure at a reciprocating compressor. It may also be possible to use a controller which performs its control functions based upon the refrigerant pressure or temperature curve of a centrifugal compressor. The vital point is that the controller carries on the control as a function of the temperature of the water off the double-condenser varies.

With the system of the illustrative embodiment, provision is made for very accurate and precise control with great efficiency with regard to the consumption of power for operating the system. It should be recognized that various of the control features may be omitted for any one of a number of reasons and yet very substantial benefits will be derived in the utilization of the invention. Also, certain of the control features of the present embodiment will overlap in some systems, in the sense of providing a duplication in accomplishing the functions.

Hence, it should be understood that various embodiments of the present invention and modifications thereof may be made without departing from the scope of the invention.

It will be understood that further changes may be made in the construction, arrangement of elements and the method of control without departing from the spirit or scope of the invention. Therefore, without limitation in this respect, the invention is defined by the following claims.

What is claimed is:

1. In a system for maintaining acceptable temperature conditions within a plurality of zones or spaces wherein one or more of the zones or spaces requires cooling while another requires heating, the combination of, refrigeration means operative to provide separate streams of chilled liquid and heated liquid, means to supply said streams to a plurality of air-treating units and to return the liquid to the refrigeration means, means constituting a source of auxiliary heat for said zones or spaces, means to discharge heat from the system, and control means including means to sense the temperature of said stream of heated liquid after it passes from said refrigeration means and before it passes to said air-treating units, said control means acting to exert complete control upon the entire system responsive to the temperature of said stream of heated liquid and including means to control the amount of heat which is discharged from the system and to prevent the simultaneous addition of said auxiliary heat to the system and the operation of said means to discharge heat from the system.

2. A system as described in claim 1 wherein said refrigeration means includes a first condenser section through which liquid passes to said stream of heated liquid and a second condenser section in parallel therewith, and wherein said means to discharge heat comprises a cooling tower and a water-circulating system for passing cooled water through said second condenser section and including bypass means through which the cooled water may flow without passing through said cooling tower, said control means being operative to vary the flow of water through said bypass means and thereby exert control upon the amount of heat which is discharged from the system through said cooling tower.

3. A system as described in claim 1 wherein one of said air-treating units receives fresh air and includes an air and liquid heat exchange unit through which liquid flows from said streams in heat exchange relationship with a stream of air which includes controlled portions of fresh air, said control means including means to increase the amount of said fresh air upon a rise in the temperature of said heated liquid above a predetermined set value.

4. A system as described in claim 1 wherein said control means includes modulating means responsive to the outside air temperature and having the status of a master control relationship to reset the control functions carried on in accordance with a predetermined set temperature.

5. A system as described in claim 3 wherein said air-treating units include a second unit through which return air passes in heat exchange relationship with liquid from said streams and the liquid is then returned, said system including means by which liquid which has been passed in heat exchange relationship with fresh air may be directed to the second named air-treating unit in heat exchange relationship with the streams of return air, and means by which the liquid from said second named air-treating unit may be utilized as the stream of heated liquid passing to the first-named air-treating unit.

6. A system as described in claim 1 wherein said means to supply said streams to said air-treating units is a three-pipe system with separate streams returning from the first named of said air-treating units and said second air-treating unit, and which includes a first pump and a second pump connected respectively to said separate streams with said first pump receiving the stream from the first named of said air-treating units and directing the liquid to the chilled liquid stream and said second pump receiving the stream from said second air-treating unit and directing the liquid to the heated liquid stream, and a line connecting the inlets of said pumps and another line connecting the outlets of said pump whereby said pumps operate in parallel relationship.

7. A system as described in claim 6, which includes means to deliver liquid from said second pump directly to the first named of said heat-treating units.

8. A system as described in claim 1 which includes a booster heater through which said stream of heated liquid flows after it passes through said refrigeration system, and wherein said control means is responsive to the temperature of the heated liquid flowing from said booster heater.

9. A system as described in claim 4 which includes a cooling tower for discharging heat from the system, and wherein said control means varies the operation of said cooling tower in accordance with said set temperature.

10. A system as described in claim 1 which includes a fan for delivering air through one of said air-treating units for the interior of a building, volume control means, a motor for operating said volume control means and a sensing element responsive to the temperature of the air leaving said fan and connected to control the volume of air delivered by said fan.

11. A system as described in claim 1 wherein said means to supply said streams of liquid to said units and to return the liquid is a three-pipe system comprising separate lines for the chilled liquid and the heated liquid extending to each of said air-treating units and a single line through which all of the liquid flows from the air-treating unit.

12. A system as described in claim 1 wherein a first of said air-treating units receives fresh air and a second of said air-treating units is for return air, and wherein said control means is operative to prevent the supplying of heated liquid to said first air-treating unit and to supply return liquid directly to said first air-treating unit from said second air-treating units, whereby heat is carried from the return air directly to the fresh air.

13. A system as described in claim 1 which includes, an air preheater for the fresh air, and wherein said control means varies the operation of said air preheater in accordance with said temperature of the heated liquid.

14. A system as described in claim 3 wherein said control means includes means responsive to the outside temperature and operative to change said set temperature.

15. In the art of conditioning a plurality of spaces or zones with a single system of interconnected streams of liquid wherein separate streams of heated liquid and cooled liquid are supplied to a plurality of air-treating units, the improvement which comprises, sensing the temperature of the heated liquid, adding heat to the system when the sensed temperature is below a predetermined set value, discharging heat from the system when said sensed temperature is above said predetermined set value, and maintaining the operating conditions unchanged when said sensed temperature is substantially at said set value.

16. In a method for maintaining acceptable temperature conditions within a plurality of zones or spaces wherein one or more of the zones or spaces requires cooling while another requires heating, the steps of, utilizing refrigeration means to provide separate streams of chilled liquid and heated liquid, supplying said streams to a plurality of air-treating zones and returning the liquid to the refrigeration means with a single stream flowing from each of said zones, sensing the temperature of said stream of heated liquid before it passes to said air-treating zones, adding auxiliary heat to the system when said temperature is below a set value, discharging heat from the system when said temperature is above said value, maintaining the operating conditions substantially unchanged when said temperature is substantially at said set temperature, and preventing the addition of said auxiliary heat when heat is being discharged from the system by the refrigeration system.

* * * * *